(12) United States Patent
Silbert et al.

(10) Patent No.: US 12,038,074 B1
(45) Date of Patent: Jul. 16, 2024

(54) ELECTRIC DRIVE MODULE WITH TOWING AND RECOVERY

(71) Applicant: FCA US LLC, Auburn Hills, MI (US)

(72) Inventors: Richard S Silbert, Bingham Farms, MI (US); Patrick Reed, Washington, MI (US); Jason Vincent, Howell, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/326,565

(22) Filed: May 31, 2023

(51) Int. Cl.
| | |
|---|---|
| *B60K 1/00* | (2006.01) |
| *B60B 35/12* | (2006.01) |
| *B60B 35/14* | (2006.01) |
| *F16D 48/00* | (2006.01) |
| *F16H 37/08* | (2006.01) |
| *F16H 48/08* | (2006.01) |
| *F16H 63/34* | (2006.01) |
| *B60L 50/60* | (2019.01) |

(52) U.S. Cl.
CPC ....... *F16H 37/0813* (2013.01); *B60B 35/125* (2013.01); *B60B 35/14* (2013.01); *B60K 1/00* (2013.01); *F16D 48/00* (2013.01); *F16H 48/08* (2013.01); *F16H 63/3416* (2013.01); *B60B 2900/212* (2013.01); *B60K 2001/001* (2013.01); *B60L 50/60* (2019.02); *F16H 2048/087* (2013.01)

(58) Field of Classification Search
CPC ............................ B60K 1/00; B60K 2001/001
See application file for complete search history.

(56) References Cited

U.S. PATENT DOCUMENTS

| | | | | |
|---|---|---|---|---|
| 5,715,901 | A * | 2/1998 | Tokushima | F16H 1/06 180/65.6 |
| 8,839,898 | B2 * | 9/2014 | Mimura | F16H 63/3416 180/908 |
| 8,899,381 | B2 * | 12/2014 | Ebihara | F16H 57/0423 184/6.12 |
| 8,992,366 | B2 * | 3/2015 | Gassmann | B60K 1/00 475/221 |
| 9,518,620 | B2 * | 12/2016 | Choi | B60K 23/08 |
| 9,731,598 | B2 * | 8/2017 | Reed | B60K 17/346 |
| 2023/0001785 | A1 * | 1/2023 | Gebhard | F16D 23/12 |

FOREIGN PATENT DOCUMENTS

| | | | | |
|---|---|---|---|---|
| DE | 102013108416 A1 * | 2/2015 | | B60K 1/00 |
| DE | 102015122801 A1 * | 2/2017 | | B60K 1/00 |
| JP | H07317848 A * | 12/1995 | | |

* cited by examiner

*Primary Examiner* — Sherry L Estremsky
(74) *Attorney, Agent, or Firm* — Jeremy J. Klobucar

(57) ABSTRACT

An electric drive vehicle includes an electric motor having an output shaft, a gearbox assembly operably coupled to the output shaft, and a differential assembly configured to drive first and second axle shafts, where the first axle shaft includes separated first and second shaft portions. A disconnect system is configured to selectively connect the first shaft portion and the second shaft portion. In a driving mode, the disconnect system connects the first and second shaft portions for common rotation. In a towing mode, the disconnect system disconnects the first and second shaft portions to enable the electric drive vehicle to be towed without backdriving the electric motor.

11 Claims, 2 Drawing Sheets

ELECTRIC DRIVE MODULE WITH TOWING AND RECOVERY

FIELD

The present application relates generally to a vehicle electric drive module and, more particularly, to a vehicle electric drive module to allow for towing or recovery.

BACKGROUND

Electric vehicles (EVs) are an increasingly popular type of vehicle. However, many EVs cannot be towed like typical internal combustion engine vehicles due to the configuration of their electric powertrains. Such traditional towing is undesirable because when the EV wheels spin while being towed, the powertrain generates electricity, which can potentially damage system components such as the power inverter module. Accordingly, EV towing is limited to flatbed towing, which can be costlier than the traditional towing methods for internal combustion engine vehicles (e.g., hook and chain). For these same reasons, typical EVs are similarly incapable of flat towing behind another vehicle, such as a recreational vehicle (RV). Accordingly, while such vehicle electric powertrain systems do work well for their intended purpose, there is a desire for improvement in the relevant art.

SUMMARY

In accordance with one example aspect of the invention, an electric drive vehicle is provided. In one example, the vehicle includes an electric motor having an output shaft, a gearbox assembly operably coupled to the output shaft, and a differential assembly configured to drive first and second axle shafts, where the first axle shaft includes separated first and second shaft portions. A disconnect system is configured to selectively connect the first shaft portion and the second shaft portion. In a driving mode, the disconnect system connects the first and second shaft portions for common rotation. In a towing mode, the disconnect system disconnects the first and second shaft portions to enable the electric drive vehicle to be towed without backdriving the electric motor.

In addition to the foregoing, the described vehicle may include one or more of the following features: a park pawl configured to selectively engage the output shaft, wherein in the towing mode, the park pawl engages the output shaft to prevent rotation thereof; wherein in the towing mode the park pawl prevents rotation of a case of the differential assembly via the gearbox assembly; wherein when the vehicle is towed in the towing mode, the second axle shaft is driven by the ground and backdrives the differential assembly, which rotates the second shaft portion of the first axle shaft; and wherein when the vehicle towed in the towing mode, the first shaft portion of the first axle shaft rotates freely without transferring rotational motion to the second shaft portion.

In addition to the foregoing, the described vehicle may include one or more of the following features: wherein the first and second axle shafts define a vehicle rear axle; wherein the disconnect system includes a dog clutch configured to selectively connect the first and second shaft portions for common rotation; wherein the disconnect system further includes an actuator configured to move the dog clutch between a first position that connects the first and second shaft portions, and a second position that disconnects the first and second shaft portions; a controller in signal communication with the actuator and configured to control the actuator to move the dog clutch between the first and second positions; and a switch disposed within an interior of the vehicle and in signal communication with the controller, wherein the switch is configured to actuate the actuator to move the dog clutch between the first position, which corresponds to the driving mode, and the second position, which corresponds to the towing mode.

In addition to the foregoing, the described vehicle may include one or more of the following features: wherein the gearbox assembly includes a reduction gear set; wherein the reduction gear set includes a reduction input gear configured to receive rotational output from the electric motor output shaft, and a reduction output gear configured to receive rotational motion from the reduction input gear and output rotational motion to the differential assembly; and wherein the differential assembly receives rotational motion from the electric motor via the gearbox assembly and includes a differential case housing a differential gear assembly.

In addition to the foregoing, the described vehicle may include one or more of the following features: wherein the differential gear assembly includes a first and a second side gear rotatably mounted within the differential case, the first and second side gears being co-axially aligned along an axis of rotation of the differential case, the first side gear coupled with the second shaft portion of the first axle shaft for common rotation, and the second side gear coupled with the second axle shaft for common rotation; and wherein the differential gear assembly further includes a plurality of pinion gears disposed between the first and second side gears and rotatably mounted to a pinion gear shaft that is fixed for rotation with the differential case.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously described, typical electric vehicles (EVs) cannot be towed using conventional towing methods and must instead rely on flatbed towing due to potential damage to the EV powertrain. Accordingly, systems and methods are described herein for an EV with a disconnectable electric drive module (EDM) to allow for recovery towing and flat towing without powertrain damage. In the example embodiment, the vehicle drivetrain includes a disconnect system dog clutch disposed on an output of the differential. The disconnect system allows for the open differential to disconnect a single wheel and not back drive the electric motor. The system includes a normal or engaged mode where the disconnect system dog clutch is engaged and configured to provide all normal drive modes as well as park securement, and a recovery or towing mode where the disconnect system dog clutch is disengaged and configured to allow for towing or recovery of the vehicle without back driving the electric motor.

Figure 1:
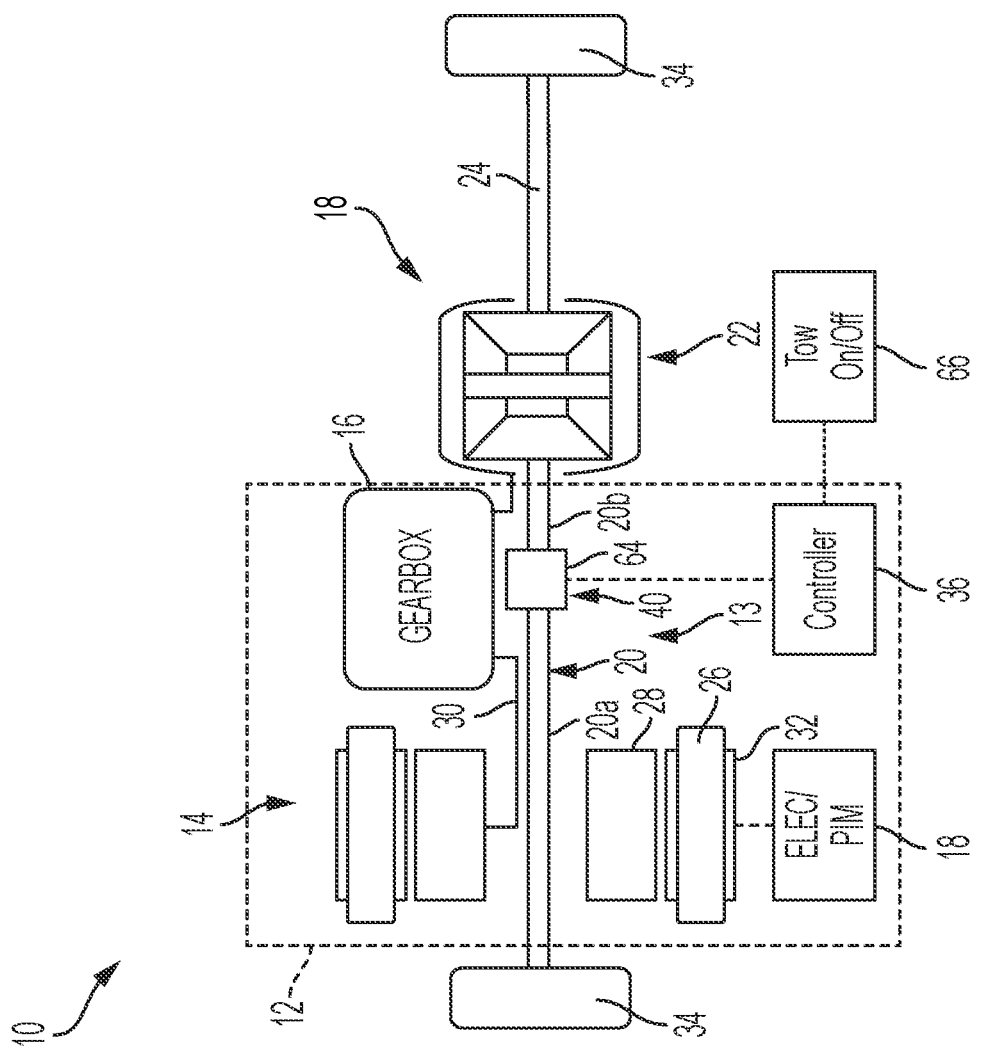
FIG. 1 is a schematic illustration of an example electric vehicle powertrain including an electric drive module, in accordance with the principles of the present application.

With initial reference to FIG. 1, a vehicle 10 is partially shown in accordance with the principles of the present disclosure. In the example embodiment, vehicle 10 includes an electric drive module (EDM) 12 configured to generate and transfer drive torque to a driveline 13 for vehicle propulsion. The EDM 12 generally includes one or more electric drive units or motors 14 (e.g., electric traction motors), an electric drive gearbox assembly 16, and power electronics including a power inverter module (PIM) 18. The electric motor 14 is selectively connectable via the PIM 18 to a high voltage battery system (not shown) for powering the electric motor 14. The gearbox assembly 16 is configured to transfer the generated drive torque to the driveline 13, including a first or left axle shaft 20, a differential assembly 22, and a second or right axle shaft 24.

In the example embodiment, the electric motor 14 generally includes a stator 26, a rotor 28, and a rotor output shaft 30. The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34. In the illustrated example, the EDM 12 is configured for a rear axle (axles 20, 24) of the vehicle 10, but it will be appreciated that the systems and methods described herein are equally applicable to a front axle EDM configuration. An electrified vehicle control unit (EVCU) 36 controls the EDM 12 to generate a desired amount of drive torque to meet a driver demand (e.g., input via an accelerator pedal).

As previously described, in the example embodiment, the vehicle 10 includes a disconnect system 40 configured to selectively disconnect the EDM 12 from the axles 20, 24 such that vehicle 10 may be recovery/flat towed without damaging EDM electrical components such as PIM 18. In this way, the vehicle 10 is configured to selectively operate in a normal driving mode and a recovery/flat towing mode. In the normal driving mode, the disconnect system 40 operably connects the axles 20, 24 to the electric motor 14 to drive the wheels 34. In the recover/flat towing mode, disconnect system 40 disconnects the left axle 20 from the differential assembly 22 such that the right axle 24 and wheel 34 are driven through the road at road speed to back drive the differential assembly 22, as will be described herein in more detail.

Figure 2:
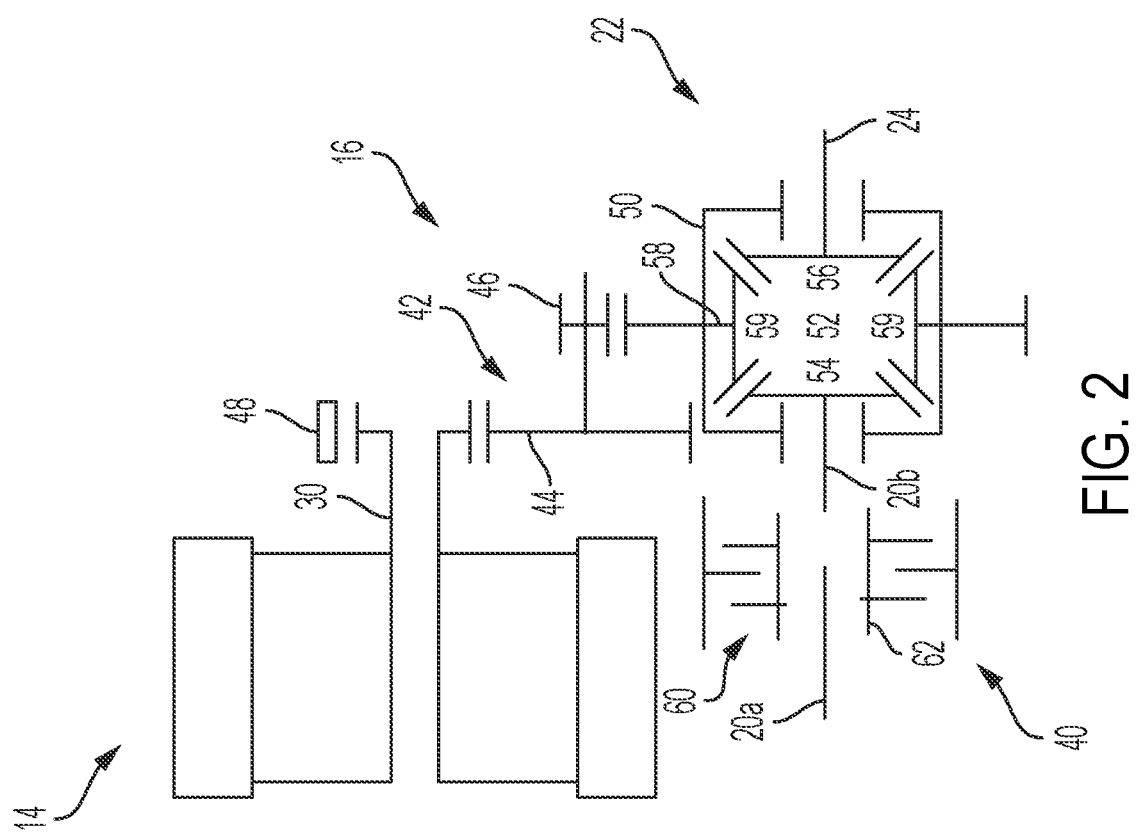
FIG. 2 is a schematic illustration of the example electric powertrain shown in FIG. 1, in accordance with the principles of the present application.

With reference now to FIG. 2, the electric drive gearbox assembly 16 will be described in more detail. In the example embodiment, the gearbox assembly 16 includes a reduction gear set 42 linked to the electric motor 14 through the motor output shaft 30. Rotational output from the motor output shaft 30 is received by a reduction input gear 44 of the reduction gear set 42, which then transfers the rotation through a reduction output gear 46. The reduction output gear 46 then transfers the rotation to the differential assembly 22 to thereby rotate the vehicle axles 20, 24 and wheels 34. The EDM 12 also includes a park pawl 48 controlled by EVCU 36 and configured to selectively engage the motor output shaft 30, for example, to place vehicle 10 in a park mode. However, park pawl 48 is also utilized when vehicle 10 is operated in the towing mode to prevent rotation of the motor output shaft 30 and gearbox assembly 16, as will be described herein in more detail.

As shown in FIG. 2, the differential assembly 22 receives rotational motion from the electric motor 14 via the gearbox assembly 16. The differential assembly 22 includes a differential case 50 housing a differential gear assembly 52 that generally includes a pair of side gears 54, 56 that are mounted for rotation with the axle shafts 20, 24 and drive wheels 34. A cross pin or pinion gear shaft 58 is fixedly mounted to the differential case 50 for rotation therewith. A corresponding set of pinion gears 59 are mounted for rotation with the pinion gear shaft 58 and are in meshing engagement with the side gears 54, 56.

In the example embodiment, the disconnect system 40 generally includes a clutch 60 disposed outside of differential case 50 on one axle shaft, such as left axle shaft 20. As shown in FIG. 2, axle shaft 20 includes a first shaft portion 20a and a second shaft portion 20b configured to be selectively coupled by clutch 60. The first shaft portion 20a includes a first end coupled to the wheel 34 and an opposite second end operably associated with the dog clutch 60. The second shaft portion 20b includes a first end coupled to the side gear 54 and an opposite second end operably associated with the dog clutch 60. In the illustrated example, clutch 60 is a dog clutch including a sliding collar 62 having gear teeth (not shown) configured to engage complementary gear teeth (not shown) on the second end of first shaft portion 20a and the second end of second shaft portion 20b. In this way, clutch 60 is movable between a first position that connects the first and second shaft portions 20a, 20b for common rotation, and a second position that disconnects the first and second shaft portions 20a, 20b.

In the example embodiment, an actuator 64 (FIG. 1) is configured to move the clutch 60 between the first and second positions. The actuator 64 may be any suitable actuator such as a hydraulic or electro-mechanical actuator. Actuator 64 may be in signal communication with and controlled by the EVCU 36. Moreover, control of the actuator 64 and thus the connection status of the clutch 60 may be controlled by a user of vehicle 10. For example, vehicle 10 can include an interior vehicle switch 66 (FIG. 1) such as a physical button or soft button displayed on a vehicle display to enable the user to move the clutch 60 to the first position or the second position. In the example embodiment, the clutch first position (connected axle) corresponds to the normal driving mode, and the clutch second position (disconnected axle) corresponds to the recovery/flat towing mode.

With continued reference to FIG. 2, operation of the vehicle 10 and disconnect system 40 will be described in more detail. In the example operation, the disconnect system 40 is by default in the normal driving mode where the clutch 60 is in the first position and couples the first and second shaft portions 20a, 20b for common rotation. In this way, axle shaft 20 operates as a solid, contiguous shaft. Rotation from motor output shaft 30 is transferred to the gearbox assembly 16, which in turn transfers motion through the differential gear assembly 52. The differential gear assembly 52 outputs rotational motion through the side gears 54, 56 to the respective axle shafts 20, 24 to thereby rotate wheels 34 in a forward or reverse direction depending on the rotation direction of motor output shaft 30.

When a user desires to tow the vehicle 10, the vehicle is switched to the recovery/flat tow mode, for example, via switch 66. In this mode, the vehicle is first put into park and the EVCU 36 engages the park pawl 48 to the motor output shaft 30 to prevent rotation thereof. This also prevents rotation of the gearbox assembly reduction gear set 42, as well as the connected differential case 50. The user then engages switch 66 to command the EVCU 36 to activate the actuator 64 and move the clutch 60 from the connected first position to the disconnected second position. As such, the clutch 60 is shifted to disconnect the first and second axle portions 20a, 20b. The vehicle 10 is now in the recovery/flat tow mode and may be towed.

During towing, the vehicle wheels 34 rotate at road speed due to contact with the road/ground. As the left wheel 34 rotates, the first axle portion 20a is also rotated due to the connection therebetween. However, because the dog clutch 60 is disconnected, rotation of the first axle portion 20a is not transferred to the second axle portion 20b. As the right wheel 34 rotates, the right axle 24 is also rotated due to the connection therebetween, and rotational motion of the right axle 24 is transferred to the right side gear 56. Due to the engagement between park pawl 48 and motor output shaft 30, the differential case 50 is also prevented from rotation. Accordingly, rotation of the right side gear 56 is transferred through the differential gear assembly 52 and drives the left side gear 54 and second axle portion 20b at negative road speed. Because the dog clutch 60 is disconnected, rotation of the second axle portion 20b is not transferred to the first axle portion 20a. In this way, the vehicle 10 can be towed without backdriving the motor output shaft 30 and causing potential damage to the EDM 12.

Described herein are systems and methods for enabling recovery/flat towing of an electric vehicle with an EDM to drive an axle having first and second axle shafts operably coupled by a differential. A disconnect system includes a dog clutch to selectively disconnect first and second portions of the first axle shaft. In the recovery/flat towing mode, with a park pawl engaged to prevent rotation of the e-motor output shaft, the dog clutch disconnects the first and second portions of the first axle shaft. During towing, the first portion of the first axle shaft is connected to one vehicle wheel and rotates freely therewith without transferring rotational motion to the second portion of the first axle shaft. An opposite vehicle wheel is driven by the road and transfers rotational motion to the connected second axle shaft, through the differential, and to the second portion of the first axle shaft. In this way, the vehicle wheels rotate without backdriving the e-motor to prevent damage thereto during the towing operation.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electric drive vehicle, comprising:
   an electric motor having an output shaft;
   a gearbox assembly operably coupled to the output shaft;
   a differential assembly configured to drive first and second axle shafts, wherein the first axle shaft includes separated first and second shaft portions;
   a disconnect system including an actuator configured to selectively move a dog clutch between a first position to connect the first shaft portion and the second shaft portion, and a second position that disconnects the first and second shaft portions;
   a controller in signal communication with the actuator and configured to control the actuator to move the dog clutch between the first and second positions;
   wherein in a driving mode, the disconnect system connects the first and second shaft portions for common rotation, and
   wherein in a towing mode, the disconnect system disconnects the first and second shaft portions to enable the electric drive vehicle to be towed without backdriving the electric motor; and
   a switch disposed within an interior of the vehicle and in signal communication with the controller, wherein the switch is configured to actuate the actuator to move the dog clutch between the first position, which corresponds to the driving mode, and the second position, which corresponds to the towing mode.

2. The electric drive vehicle of claim 1, further comprising a park pawl configured to selectively engage the output shaft,
   wherein in the towing mode, the park pawl engages the output shaft to prevent rotation thereof.

3. The electric drive vehicle of claim 2, wherein in the towing mode the park pawl prevents rotation of a case of the differential assembly via the gearbox assembly.

4. The electric drive vehicle of claim 3, wherein when the vehicle is towed in the towing mode, the second axle shaft is driven by the ground and backdrives the differential assembly, which rotates the second shaft portion of the first axle shaft.

5. The electric drive vehicle of claim 4, wherein when the vehicle is towed in the towing mode, the first shaft portion of the first axle shaft rotates freely without transferring rotational motion to the second shaft portion.

6. The electric drive vehicle of claim 1, wherein the first and second axle shafts define a vehicle rear axle.

7. The electric drive vehicle of claim 1, wherein the gearbox assembly includes a reduction gear set.

8. The electric drive vehicle of claim 7, wherein the reduction gear set comprises:
   a reduction input gear configured to receive rotational output from the electric motor output shaft; and
   a reduction output gear configured to receive rotational motion from the reduction input gear and output rotational motion to the differential assembly.

9. The electric drive vehicle of claim 1, wherein the differential assembly receives rotational motion from the electric motor via the gearbox assembly and includes a differential case housing a differential gear assembly.

10. The electric drive vehicle of claim 9, wherein the differential gear assembly includes a first and a second side gear rotatably mounted within the differential case, the first and second side gears being co-axially aligned along an axis of rotation of the differential case, the first side gear coupled with the second shaft portion of the first axle shaft for common rotation, and the second side gear coupled with the second axle shaft for common rotation.

11. The electric drive vehicle of claim 10, wherein the differential gear assembly further includes a plurality of pinion gears disposed between the first and second side gears and rotatably mounted to a pinion gear shaft that is fixed for rotation with the differential case.

\* \* \* \* \*